INVENTOR
DIETHELM ZSCHOKKE
By [illegible]
Att'y

Oct. 1, 1963 D. ZSCHOKKE 3,105,879

TELEPHONE SUBSTATION INCLUDING DEVICE FOR PRE-SETTING MULTIPLE SYMBOL COMBINATIONS

Filed June 23, 1958 2 Sheets-Sheet 2

INVENTOR

DIETHELM ZSCHOKKE

By

Att'y

United States Patent Office 3,105,879
Patented Oct. 1, 1963

3,105,879
TELEPHONE SUBSTATION INCLUDING DEVICE FOR PRE-SETTING MULTIPLE SYMBOL COMBINATIONS

Diethelm Zschokke, Solothurn, Switzerland, assignor to Autophon Aktiengesellschaft, Solothurn, Switzerland
Filed June 23, 1958, Ser. No. 743,618
Claims priority, application Switzerland June 27, 1957
2 Claims. (Cl. 179—90)

This invention relates to telephony, and more particularly to telephone sub-stations incorporating means for pre-setting multiple signal combinations.

Copending application for U.S. Letters Patent Serial No. 688,583 discloses a telephone sub-station wherein a scanning device is moved past record carriers which by a pre-setting procedure, have been disposed in the path of the scanning device, whereby impulses are generated electro-magnetically. This disclosure includes embodiments involving magnetic recordings requiring a scanning device not equipped with a permanent magnet, and embodiments involving variable permeability recordings which require a scanning device equipped with a permanent magnet. All these systems have the drawback in common that they require quite a lot of space in the direction of scanning. A further disadvantage is due to the presence of discontinuities in the record carrier. These discontinuities, which extend at right angles to the scanning direction and which are almost bound to be found at the points of junction of two record carriers, can give rise, in the course of the scanning procedure, to parasitic impulses.

It is an object of the present invention to obviate these drawbacks, and to provide systems of the aforenoted kind which lack excessive space requirements in the scanning direction, and wherein parasitic impulses are eliminated.

Other objects, and the manner in which the same are attained, will become apparent from the following specification.

The present invention contemplates a telephone substation incorporating means for pre-setting multiple signal combinations, wherein the scanning device includes at least two poles disposed in a plane extending at right angles to the scanning direction. The records extend across the width of the record carriers, with the result that for a record of a certain information, a materially narrower width is required in the scanning direction than for a record extending longitudinally of the record carrier. The recording across the carrier width renders possible the application of the push-pull principle whereby the influence of the points of junction, and the parasitic impulses arising from discontinuities at these points, can be eliminated, and distortions can be reduced. This push-pull characteristic is attained due to the use of a scanning device with two poles, the recordings being so selected that below these two poles which hereinafter are referred to as "principal poles," there are always disposed recordings having opposite signs.

A further distinctive feature of the invention resides in the particular manner in which the recordings are scanned magnetically. In contradistinction to conventional scanning systems wherein the magnetically effective spread in the scanning direction is small, compared with the width of the recorded impulses, the present invention contemplates a width of the poles in the scanning direction which is equal to the width of the recorded impulses. In this arrangement, the magnetic flux arising in the scanning direction no longer corresponds to the instantaneous value, as in the conventional system, but is proportional to the mean value of the recorded function ascertained over the width of the pole. The course of the flux displays flanks which are inclined with respect to the course of the recordings. Thus it is possible to obtain in the scanning device, the output voltage of which is proportional to the first derivation of the course of the flux, approximately rectangular voltage impulses. This result is contingent on the prerequisites that positive and negative impulses must be used, and that the total duration of the negative impulses is equal to that of the positive impulses. This leads, almost necessarily, to the use of a code so that the examples of the invention described below, involve a code. Inasmuch as the signal recording to be scanned, which corresponds to a symbol combination pre-set at the station, is composed of optionally combined recordings of partial signals, the condition noted above must be satisfied, even with respect to the individual partial signals. Consequently, only such a code can be used for present purposes as meets the above-noted condition with respect to each partial signal. The embodiments of the invention exemplified below, therefore, make use of a code, wherein each symbol consists of a group of four impulses which can be positive, negative or zero (pause). The groups of impulses forming the individual signals are joined without interruption.

In the drawings accompanying this specification and forming part thereof, several embodiments of scanning devices incorporated in the telephone sub-stations according to the invention, are illustrated diagrammatically by way of example, whereas other components of these stations, which are not directly involved by the invention, are neither shown nor described.

In the drawings,

FIG. 1 demonstrates, in connection with a mechanical record carrier, the interrelation between the shape of the records, the magnetic flux which results in the scanning device, and the voltage generated thereby;

FIGS. 2, 3, and 5 are views seen in the direction of scanning, while FIG. 4 is a perspective view;

Figures 1, 2, 3, 4, 5, 6, 7:
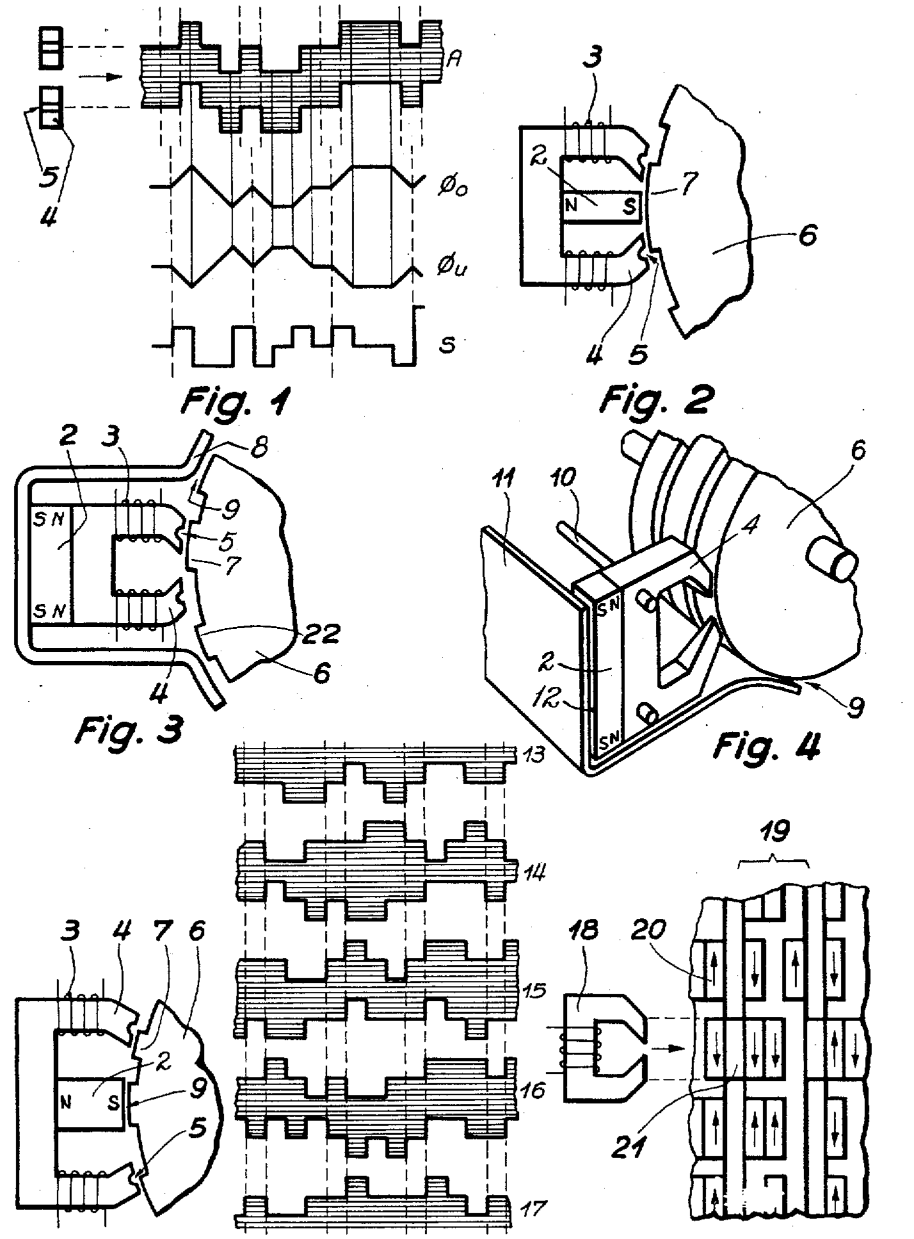
FIGS. 2, 3, 4 and 5 illustrate several embodiments of scanning devices for scanning mechanical recordings, and correlated record carriers.
FIG. 6 shows the development of the record carrier when viewed from the scanning device according to FIG. 5.
FIG. 7 illustrates, on the right, the development of a record carrier bearing a magnetic recording, and on the left, the correlated scanning device angularly displaced into the plane of the drawing.
Figure 8:
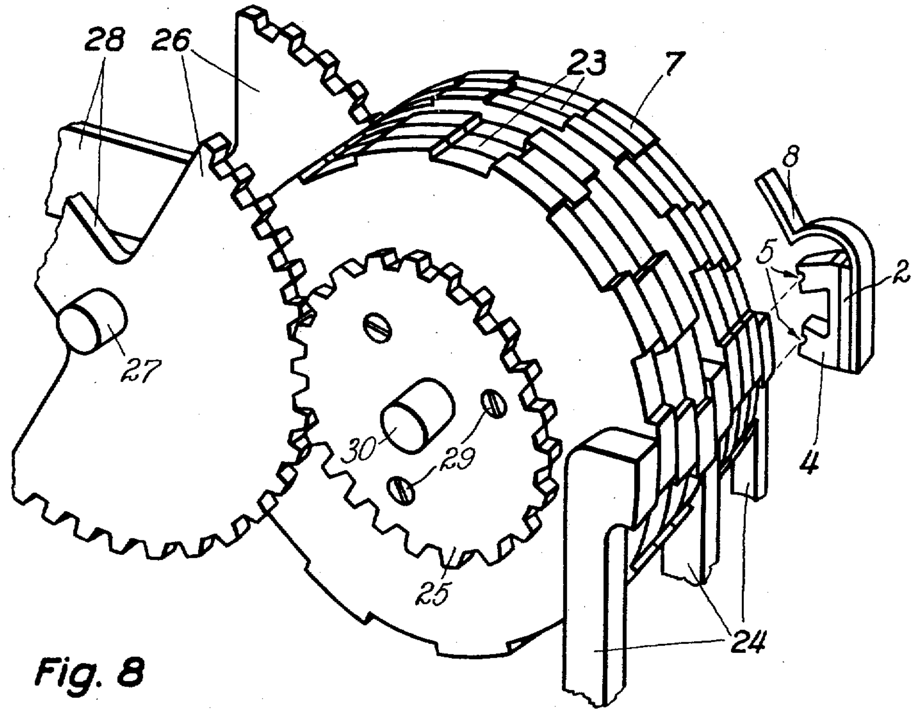
Figure 9:
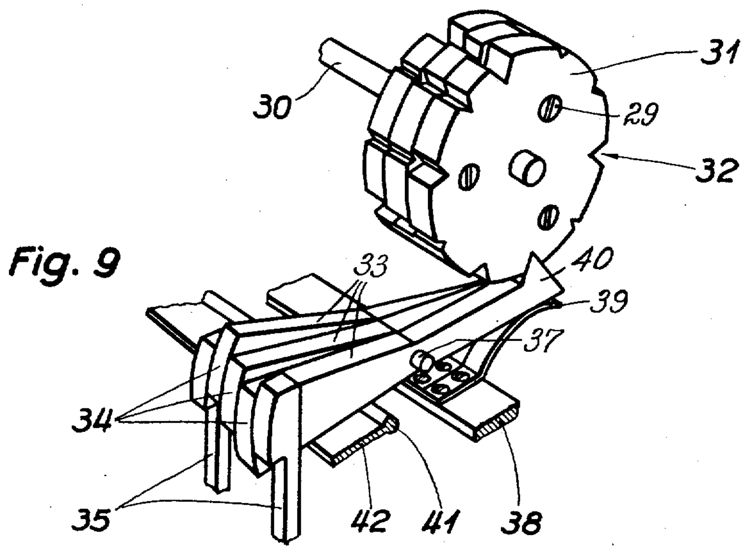

FIG. 8 shows, on an enlarged scale, a perspective view of a sector of the entire pre-setting and scanning system, as incorporated in a corresponding telephone sub-station; the arrangement is shown for two decimal places; and FIG. 9 is a perspective showing, on an enlarged scale, of an embodiment of a record carrier susceptible of being pre-set which deviates materially from the embodiments illustrated in the other figures, but which can be scanned by means of the scanning device shown in FIG. 2.

Referring to the drawings, and first to FIGS. 1 and 2, the principle of scanning variable permeability recordings disposed at right angles to the direction of scanning is explained as follows. The recordings are arranged, in the form of elevations 7, on a drum 6. The scanning device, on principle, comprises two poles 4 each of which is provided with a winding 3, and a permanent magnet 2. The magnetic circuit of the permanent magnet passes, in two parallel branches, across the two principal poles to the record carrier from where it returns along another path. In the embodiment according to FIG. 2, this return is effected directly through the permanent magnet. In some of the embodiments to be described below, auxiliary poles are used for this purpose. The elevations acting as records are so arranged that an elevation is disposed either below the total surface of one of the poles, or below half the surfaces of one as well as the other pole, provided it faces the scanning device. These positions are referred to below as the upper and lower extreme positions, and the neutral position. The neutral position is shown, for example, in FIG. 2 whereas an extreme position is illustrated in FIG. 3. In the neutral position (FIG. 2) the flux through the two poles is equal. In an extreme position (FIG. 3), however, the permanent flux passes almost exclusively through a single pole only. The character of the records responsible for the saving of space in the scanning direction, is expressed by the displacement of the elevations, corresponding to the different records, in the plane disposed at right angles to the scanning direction, i.e. in FIGS. 2 and 3 in the plane of the drawing. The poles of the scanning device are situated in a parallel plane also disposed at right angle with respect to the scanning direction. Inasmuch as the neutral position of the elevations does not result in any output voltage in the scanning device, it is self-evident that in this instance a variation of the distance between the record carrier and the scanning device, has no influence on the delivered voltage. This is the case because the influences exerted on the two poles cancel one another due to a push-pull effect, whereby in the range of neutral recordings, radially acting discontinuities in the record carrier have no effect. Each pole has a centrally located recess in the form of a groove 5 extending in the scanning direction. The parts of the elevation disposed opposite these grooves are magnetically ineffective so that, as readily apparent from FIG. 2, these grooves reduce the influence of an inaccurate position of a neutral recording with respect to the scanning device, in that the borders of these recordings are disposed underneath the grooves. Inaccuracies of position transversely to the scanning direction, therefore, have no influence in this case. In the case of the extreme positions, the influence of any inaccuracies can be eliminated readily by providing the elevations larger than the poles.

FIG. 1 illustrates the effect of the records on a scanning device moved past the same. The view of the mechanically recorded impulses is denoted with A; the hatched part represents the elevated records which are composed by joining individual records of the kind noted above. The unit width of the records corresponds—as noted above—to the magnetically effective width (pole width) in the scanning direction (indicated by the arrow). The projection of the magnetically effective pole surfaces of the scanning device is denoted with 4. The magnetic fluxes arising, in any position of the scanning device, in the upper and lower poles are denoted with $\phi o$ and $\phi u$. They can be derived readily from the record pattern A provided the increasing or diminishing overlapping of records and pole surfaces are taken into consideration. The curve denoted with S represents the characteristic of the voltage generated on the coils of the scanning device during the movement thereof. This voltage characteristic is the derived function of the course of the magnetic fluxes. It is in the form of rectangular impulses the contours of which, of course, do not corrsepond to those of the records. These conditions are possible only on the premise that the magnetic flux varies between a positive and a negative standard value, and that it equals zero at the start and at the end. As the records to be scanned are composed of optional partial recordings, it is necessary that the conditions noted above are satisfied also with respect to these partial recordings. Logically it follows that every partial recording must display, at the start and at the end, a neutral record, and that—as noted at the outset—the sums of the negative and positive impulses are equal. In the embodiments to be described below, the neutral records mentioned above are fixedly arranged between variable partial recordings. In FIG. 1, the dash lines indicate, on the one hand, with the records A the limits of the fixed records, and, on the other hand, with the fluxes $\phi$ and the impulses S, the limits between the fluxes or groups of impulses corresponding to the individual partial recordings. Radially effective discontinuities can occur only at the first-named limits, i.e., only at the transition points from or to a neutral recording. In these places, as explained above, the discontinuities cannot ever cause additional, parasitic impulses.

In the place of a variable permeability recording, a magnetic recording can be used. The scanning device is simplified in this instance as the permanent magnet and the auxiliary poles are eliminated. The two extreme positions of the mechanical recording are replaced by magnetizing in two different directions, and the neutral position is matched by an absence of any magnetizing. The record consists of a pattern which is composed of zones extending at right angles to the direction of scanning and magnetized on a smooth sheet of magnetic material or some other ferromagentic body of high coercive force. Here also the magnetic flux is directed transversely to the scanning direction, and the poles of the scanning device again are disposed in a plane extending at right angles to the direction of scanning. Because of the use of two magnetizing directions here, too, the records have push-pull characteristics. FIG. 7 illustrates diagrammatically the development of a record carrier. The zones magnetized on the carrier are represented in the form of rectangles 20, the magnetizing directions being indicated by arrows. The carriers of partial records adapted to be pre-set, are denoted with 19. Neutral intermediate portions 21 are disposed between these record carriers, the same as with their mechanical counterparts. The scanning device 18 has been turned by 90° in order to be shown in the drawing. This scanning device carries a single winding only. The conditions regarding the extent of the records and the poles in the scanning direction, the overlapping and the course of the flux correspond to those described with reference to FIG. 1, except that a single flux only is present. Preferably, the record carrier is magnetized by means of a stencil.

The following description of some embodiments of the invention is intended to exemplify the great variety of applications to which the invention lends itself. As noted above, the scanning of mechanical recordings requires a permanent magnet to be arranged in the scanning device, the magnetic flux of this permanent magnet passing through the two principal poles to the record carrier. For the return path, several possibilities exist. The fairly obvious solution according to FIG. 2 involves the drawback that the record carrier takes up a relatively large space as that part of the record carrier which is disposed opposite the auxiliary pole formed by the permanent magnet, is ineffective for scanning purposes yet consumes space, with the result that the record carrier is required to be relatively large. The embodiments according to FIGS. 3 to 5 avoid this drawback.

In the embodiment of FIG. 3, the space between the principal poles 4 is empty so that the records 7 to be scanned, may be provided smaller. Two auxiliary poles 8 are provided outside the principal poles 4, and opposite the records 22. The magnetically effective pole faces 8 of these auxiliary poles are relatively large so that the records which happen to be disposed therebelow, cannot influence the magnetic flux in the system. n this case, the permanent magnet is magnetized in the transverse direction.

As shown in FIG. 8, a modification of this embodiment using a single auxiliary pole may be used.

In the embodiment according to FIG. 4, the auxiliary pole 11 provided for return purposes, consists of a sheet metal plate which is stationary and extends over the entire length of the record carrier. In addition to the air gap 9, a further air gap 12 disposed between the auxiliary pole and the scanning device is required for return purposes, but the area of the air gap 12 is sufficiently large :hat it does not cause any essential resistance in the mag- ıetic circuit.

Here also, the permanent magnet 2 is magnetized :ransversely. Also shown in FIG. 4 are two rails 10 which support the scanning device for sliding displace- nent. These rails, as well as the windings of the scanning levice, are omitted in the other figures for sake of clarity.

FIG. 5 shows a further embodiment of a record car- rier and a scanning device wherein the auxiliary pole is lisposed between the principal poles as in FIG. 2, but where in spite of this a space saving recording mode is employed. This recording mode is distinguished by the feature that the records disposed below the two principal poles 4, which are correlated, are not adjacent. Between these two records, other records are arranged which are not related to the first named records. These conditions are explained in conjunction with FIG. 6; for purposes of this explanation, a continuous elevation will be referred o as a "track." As shown in FIG. 6, the bottom part of the track 13 and the top part of the track 15, together, form one recording as do the bottom part of the rack 14 and the top part of the track 16, jointly, and he bottom part of the track 15 and the top part of the rack 17, jointly. The parts of the tracks mentioned above as components of one and the same recording, are lisposed simultaneously below the poles 4 of the scanning levice whereas the auxiliary pole formed by the perma- ıent magnet 2 is disposed opposite to the recordings of he track interposed between said component tracks.

FIG. 8 illustrates a section of the overall installation or pre-setting and scanning mechanical recordings of the ype described above. This installation involves a tele- phone sub-station equipped for the pre-setting of num- bers including several digits to be dialed. With the equip- nent shown in the sectional illustration of FIG. 8, two ligits can be pre-set and the corresponding impulses gen- rated. Corresponding to the decimal structure of the en- ire system, the pre-setting device corresponding to each lecimal place includes ten positions corresponding to the en digits required. For purposes of better illustration, he records are shown on an enlarged scale. For each lecimal place, the station is provided with an adjustable lrum 23 consisting of three discs. These three discs, joint- y, are firmly interconnected with a gear 25 by means of hree rivets or screws 29, and are supported on the shaft 30. Each of the discs is provided, on its periphery, with en elevations 7. Any three elevations disposed in a line xtending parallel to the shaft 30, represent the mechani- al record of the coded impulses corresponding to a digit, o that the drums are provided, on their periphery, with en recordings corresponding to the ten different digits to e dialed. Stationary intermediate portions 24 incor- orating neutral recordings are interposed between the rums. The gear 25 connected with each drum is accom- nodated in the space between the two drums, which pace is available because of the spacing of the drums due o the insertion therebetween of the intermediate portion 24. For each drum, a toothed segment 26 is supported n a shaft 27, this toothed segment meshing with the orresponding gear 25 and being rigidly connected with a etting lever 28. Displacement of this lever results in the rotary displacement of the correlated drum 23. The levers 28 which extend through slots (not shown in the drawing) to project from the housing, by a suitable displacement, thus permit the pre-setting of the subscriber's number to be dialed. When the pre-setting procedure has been completed, the scanning device with the principal poles 4, the permanent magnet 2 and the auxiliary pole 8 is moved past the pre-set record carriers, whereby in the windings (not shown in the drawing) of the scanning device impulse voltages are induced, which are amplified and passed on to the telephone exchange. In the embodiment shown in FIG. 8, the scanning direction extends from the right to the left, as the pre-setting levers are on the opposite side where as usual, the pre-setting takes place from the left to the right. The scanning device, preferably, is moved in a flicking fashion by means of a suitable mechanism (not shown in the drawing). The discs of which the drums 23 are composed, are preferably manufactured in a punch press. As all drums are alike, three different kinds of discs only are required.

FIG. 9 illustrates an embodiment of the invention deviating, on principle, from the system including drums of FIG. 8. This embodiment permits effecting, by pre-setting, a recording disposed along a straight line and corresponding to a multiple digit number. For each digit to be transmitted, three sectors 34 are arranged for pivotal displacement on a shaft 37. Each of these sectors can assume any one of three positions, i.e. a middle, an upper and a lower position, whereby in conjunction with the stationary intermediate portions 35, the recordings of all digits can be formed. The sectors 34 are pre-set by means of controller cylinders 31, any three of which are interconnected by rivets or screws 29 and arranged to be pre-set by a device (not shown in the drawing) which may correspond to the mechanism illustrated in FIG. 8. These controller cylinders are provided, on their periphery, with notches 32 of varying depths which are engaged by the points 40 of control levers 33. Consequently, the position of the segments 34 depends on the depths of the correlated notches. These notches are so arranged that corresponding to the various positions of the controller cylinder, the recordings corresponding to the ten digits are formed by the three segments 34. An auxiliary device is provided in the form of a rail 38 mounting springs 39 which force the levers 33 against the controller cylinders. In order to cause the points 40 to disengage the notches 32 to permit adjustment of the controller cylinders, a shaft 41 mounting a rail 42 is provided, which shaft is rotated clockwise during adjustment of the controller cylinders, by means not shown in the drawing, so that the rail 42 lifts the levers 33 with the result that the points 40 become disengaged from the notches 32.

The embodiment of the invention shown in FIG. 8, of course, may also be used for scanning magnetically recorded impulses. In other respects, also, the invention is by no means limited to the embodiments shown and described for illustration rather than limitation purposes. Thus, for example, more than ten different partial signals may be pre-set and emitted. The pre-setting devices including toothed segments and drums are equally intended to serve for illustration purposes only as a great many modifications for putting the invention into effect, would be equally suitable.

I wish it to be understood that I do not desire to be limited to the details of design, construction and operation shown and described as numerous modifications all within the scope of the following claims, and involving no departure from the spirit of the invention, nor sacrifice of the advantages thereof, may occur to workers in this field.

I claim:

1. A device for pre-setting phone numbers and the like, comprising a plurality of drum shaped portions each defining a digit, a shaft supporting said portions for rotation, each drum comprising ten mutually spaced peripheral regions, each region corresponding to one of the digits, and each region consisting of three parts of equal length, at least one of them incorporating a permanent magnetic field of a certain polarity disposed substantially adjacent to one another in said regions but the assembling of the different parts with regard to their polarity being different for each region, a single magnetic reading head being arranged to move in parallel to said shaft and transversely to the peripheries of said drums and in this manner scanning a series of various magnetic fields commensurate with the decimal place corresponding with the peripheral region of the drum adjacent said head.

2. The device according to claim 1, wherein the dimension of the portion of said reading head for establishing said fields extending in the direction parallel to said shaft is at least approximately equal to the dimension o a part of one of said regions in the direction paralle to said shaft.

References Cited in the file of this patent

UNITED STATES PATENTS

| | | |
|---|---|---|
| 2,388,313 | Dowey | Nov. 6, 194 |
| 2,431,541 | Camras | Nov. 25, 194 |
| 2,567,812 | Hickman | Sept. 11, 195 |
| 2,714,048 | Baird | July 26, 195 |
| 2,771,505 | Avery et al. | Nov. 20, 195 |
| 2,821,576 | Gaubert | Jan. 28, 195 |
| 2,855,585 | Quinby | Oct. 7, 195 |
| 2,894,798 | Potter | July 14, 195 |
| 2,921,142 | Tinus | Jan. 12, 196 |